US012518008B2

(12) United States Patent
Ševčenko et al.

(10) Patent No.: US 12,518,008 B2
(45) Date of Patent: Jan. 6, 2026

(54) METHOD AND APPARATUS FOR CREATING A DATASET USING FILE CREATION DATES

(71) Applicant: UAB 360 IT, Vilnius (LT)

(72) Inventors: Aleksandr Ševčenko, Vilnius (LT); Mantas Briliauskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 629 days.

(21) Appl. No.: 17/970,677

(22) Filed: Oct. 21, 2022

(65) Prior Publication Data

US 2024/0134977 A1 Apr. 25, 2024
US 2024/0232348 A9 Jul. 11, 2024

(51) Int. Cl.

| | |
|---|---|
| ***G06F 21/56*** | (2013.01) |
| ***G06F 16/16*** | (2019.01) |
| ***G06N 20/00*** | (2019.01) |

(52) U.S. Cl.
CPC .......... *G06F 21/565* (2013.01); *G06F 16/164* (2019.01); *G06N 20/00* (2019.01); *G06F 2221/034* (2013.01)

(58) Field of Classification Search
CPC ................. G06F 21/565; G06F 16/164; G06F 2221/034; G06N 20/00
See application file for complete search history.

(56) References Cited

U.S. PATENT DOCUMENTS

| | | | | |
|---|---|---|---|---|
| 10,642,977 | B1 * | 5/2020 | Ren | G06F 21/51 |
| 10,885,188 | B1 * | 1/2021 | Batur | G06F 21/565 |
| 11,227,047 | B1 * | 1/2022 | Vashisht | G06N 20/00 |
| 11,522,889 | B2 * | 12/2022 | Annen | H04L 63/1425 |
| 2018/0041536 | A1 * | 2/2018 | Berlin | H04L 63/1416 |
| 2019/0132344 | A1 * | 5/2019 | Lem | G06N 20/00 |
| 2019/0228151 | A1 * | 7/2019 | Schmugar | H04L 63/145 |
| 2020/0204569 | A1 * | 6/2020 | Komarek | G06F 18/214 |
| 2020/0257992 | A1 * | 8/2020 | Achin | G06Q 10/04 |
| 2020/0293655 | A1 * | 9/2020 | Long | G06N 3/0895 |
| 2022/0253526 | A1 * | 8/2022 | Sanders | G06F 21/564 |
| 2023/0098919 | A1 * | 3/2023 | Kulaga | G06F 16/285 726/23 |
| 2023/0205877 | A1 * | 6/2023 | Ulasen | G06F 21/56 726/23 |

* cited by examiner

*Primary Examiner* — Javier O Guzman
(74) *Attorney, Agent, or Firm* — Moser Taboada

(57) ABSTRACT

A method and apparatus for generating a content detection dataset using file creation dates. The method accesses a database comprising data files. The files are analyzed by a machine learning model to determine file creation dates. The creation dates are used to identify relevant content files. The most relevant files are included into a content detection dataset as content samples. The dataset may be used for training machine learning based content detectors.

12 Claims, 3 Drawing Sheets

METHOD AND APPARATUS FOR CREATING A DATASET USING FILE CREATION DATES

FIELD

Embodiments of the present invention relates generally to datasets used in machine learning, and more particularly, to a method and apparatus for creating a dataset using file creation dates for use in training a machine learning based content detector.

BACKGROUND

Malware (malicious software) is ubiquitous on the Internet in the form of ransomware, computer viruses, worms, trojans, spyware, keyloggers, and so on. Malware may be intended to impact the functionality of computers and computer networks by interfering with security, privacy, and/or hardware functionality. Most malware is inadvertently downloaded by a user from the internet. The malware may be hidden in what looks to be a legitimate application or may be attached to a downloaded file.

Malware detection software searches computer files in memory (e.g., volatile or non-volatile memory) and/or files as they are downloaded to identify malware before it is activated. The process of building malware identification datasets is tedious. The public and private networks must be constantly monitored for new malware or previous malware that has been adapted to avoid detection. Once identified, the malware is scrutinized to determine "samples"—portions of code—to be used to identify the malware. The samples are placed in malware datasets to be used to identify when the malware is embedded in applications or files.

Currently, the datasets are used as databases for comparison to the content of incoming files. A character string match results in malware detection. More recently, the datasets have been used to train neural networks used by malware detectors in an attempt to learn to detect malware that is not specifically contained in the datasets. In this manner, the malware detector may anticipate new malware. However, malware detection datasets may be very large and contain a substantial amount of irrelevant malware file samples. Such large datasets require long neural network training periods and the irrelevant information may lead to errors in malware detection.

Similar techniques are used to create datasets to, more generally, train machine learning models to search for specific content within data files. Such content may include video, audio, text, executable code, boundaries between content types, etc. Currently, datasets for training neural networks to search for various types of content are very large and contain a substantial amount of irrelevant content samples.

Therefore, there is a need for improved methods and apparatuses for creating a dataset that selects relevant content samples for the dataset.

SUMMARY

A method and apparatus for creating a content dataset using file creation dates. The method accesses a database comprising datafiles. The files are analyzed to determine file creation dates. The creation dates are used to identify relevant files. The most relevant files are included into a content detection dataset as content samples. The dataset is used for training machine learning based content detectors. In one embodiment, the content is malware, and the dataset comprises relevant malware samples, where the relevancy of the sample is determined using a file creation date.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
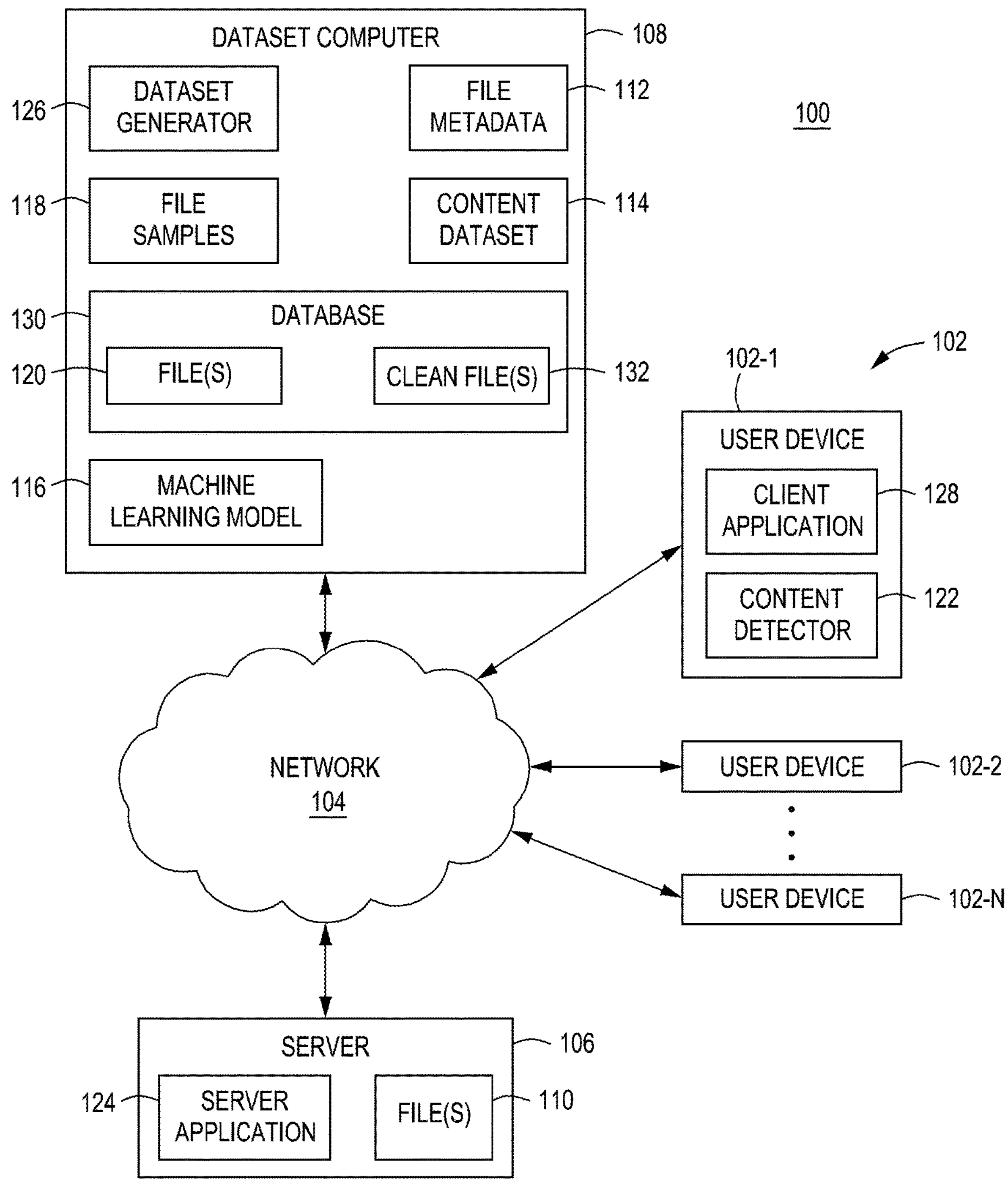
FIG. 1 illustrates an example of a computer system for creating a content detection dataset in accordance with at least one embodiment of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, apparatuses, and systems) for generating at least one content detection dataset. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the present invention generate at least one content detection dataset using the creation dates of files as an indicium of file relevance. In some embodiments, a database containing data files is accessed by a machine learning algorithm and the algorithm analyzes the files to derive a creation date for each file. The analysis includes searching not only for actual dates within the file, but also other information that may be indicative of a creation date such as references to specific dates in the file, references to operating systems or application versions that were available after particular dates, header information, compiler information, and the like. Generally, the algorithm may determine an estimate of a creation date from any information that contains date indicia either explicitly or implicitly. The file creation date information may include metadata associated with the file, i.e., found within the file, or supplied from sources other than the file itself. The creation date or information indicative of the creation date (i.e., creation date estimate) identifies the level of relevance of the malware file, i.e., most recent creation dates are most relevant. The files and their creation dates are analyzed to identify the most relevant files in the database. These most relevant files form a dataset that may be used to train a machine learning algorithm to process new files and identify whether the file(s) contains specific content such as malware.

Thus, methods and apparatuses consistent with embodiments of this present invention generate a content detection dataset. Such a dataset may be used to train a machine learning (ML) model of a content detector to scan files and identify specific types of content. If the content is malware, the content detector may identify the malware and block or remove files containing malware before they are accessed by a user device. Details of such methods and apparatuses are described in detail below with respect to the figures.

FIG. 1 illustrates an example of a computer system 100 for generating and using a content detection dataset using file creation dates in accordance with at least one embodiment of the invention. In FIG. 1, the system 100 comprises at least one user device 102, a server 106, and a computer network 104, (e.g., the Internet) connecting the server 106 to the user devices 102. The server 106 is a centralized computing device used to execute the application(s) (server application 124) and communicate file(s) 110 to user devices 102. The files 110 may contain certain content that is desirable to detect. The general structure of such a server and/or user device is described in detail below with respect to FIG. 3.

Also connected to the network 104 is a dataset computer 108 configured to generate a content detection dataset 114 in accordance with the present invention. The dataset 114 is used to train a content detector 122 executed by the user devices 102. The dataset computer 108 comprises a dataset generator 126 that utilizes a machine learning model/algorithm to derive file creation dates that are used to select relevant files to generate a dataset 114. Specifically, the generator 126 analyzes the file content and, in some embodiments, the metadata 112 of files 120/132 within a file database 130 to identify file samples 118 to be included in the dataset 114. The file database 130 may also contain clean files 132. The generator 126 analyzes a database 130 and related metadata (as described in detail in relation to FIG. 2) to produce content detection dataset 114 for training of the machine learning model 116. As described below, the generator 126 uses an estimate of the creation date of the files to build the dataset 114.

The generator 126 may be implemented using a neural network that is trained to search and classify file content to identify information indicating a creation date for file. The neural network may optionally process file metadata. In one embodiment, the neural network may utilize a recurrent neural network (RNN) architecture using a supervised learning process. The neural network is trained to identify file features (e.g., n-gram counts, header information, import-export information, etc.) and classify the features as to creation date. The identified and classified information is then used as part of the dataset 114 to train the machine learning model 116.

User devices 102-1, 102-2, 102-3 . . . 102-N (collectively referred to as user devices 102) communicate through network 104 with the server 106. In some embodiments, user device 102 can be any computing device capable of hosting a content detector 122 (executable software) and a client application 128 (browser or other applications that access or otherwise use files). User device 102 may comprise any device that is connected to a network, including, for example, a laptop, a mobile phone, a tablet computer, a desktop computer, a smart device, a router, and other network devices. The client application 128 is a well-known application for accessing and displaying web page content, e.g., file(s) delivered by the server 106. Such browsers include, but are not limited to, Safari®, Chrome®, Explorer®, Firefox®, etc. In other embodiments, the client application 128 may be any type of application that can be affected by malware.

In operation, the content detector 122 uses a trained machine learning model (e.g., model 116) that is ported from the dataset generator 126 to the user devices 102. In operation, the dataset generator 126 analyzes data files 120 from the database 130 to produce a dataset 114. The dataset 114 is used to train the machine learning model 116. The trained model is then transferred to the content detector 122 used by each user device 102. The files 110 received by the user devices 102 via the network are applied to the content detector 122. The content detector 122 identifies which files contain certain types of content by applying the files to the local machine learning model. The entire model 116 may be transferred to the detector 122 or, alternatively, the dataset 114 may be transferred to the detector 122 to train a machine learning model locally to the user device 102. Occasionally, the model or dataset is updated to reflect additional content that is detected by the dataset generator 126.

The content detector 122 may be used for various functions. In one embodiment, the content to be detected is malware (e.g., viruses, trojans, key stroke loggers, ransomware, etc.). To build a malware dataset, the dataset generator 126 analyzes both malware files 120 and clean files 132 to determine file creation dates to use as an indicium of relevancy of the files to be used in the dataset, i.e., files with recent creation dates are deemed more relevant than files with older creation dates.

In other embodiments, the content may comprise video, audio, text, executable code, boundaries between differing types of content, etc. The machine learning model is trained with a dataset of specific content that is to be identified in unknown files. Such content detection may be used for data analysis. In other embodiments, the content may be executable code or functions to be detected using a software reverse engineering tool. In these embodiments, the content to be detected is defined in the dataset and the samples in the dataset are selected based on their relevancy. The relevancy is determined using, at least in part, the creation date of the file in which the sample appeared.

The dataset generator 126 may also be used to add files to an existing dataset. Consequently, as new data files are analyzed, a dataset may be updated with the most recent content samples.

Figure 2:
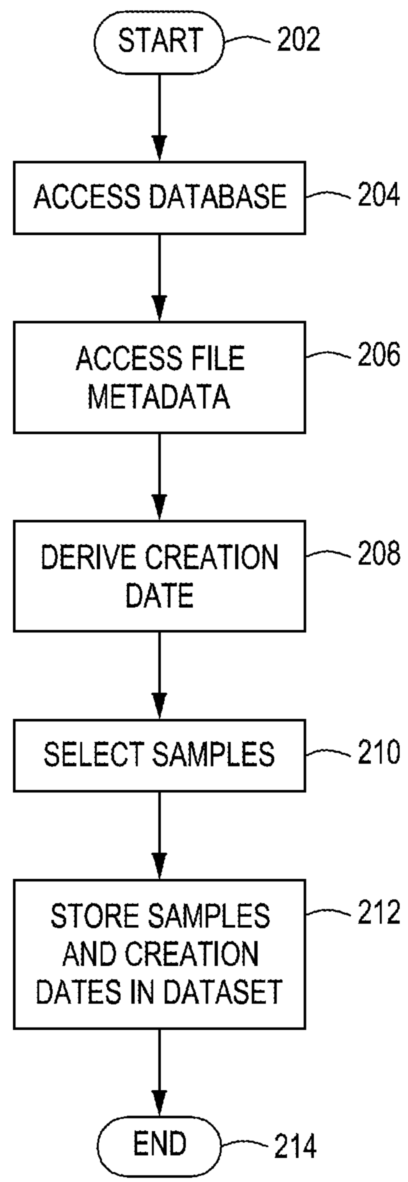
FIG. 2 is a flow diagram of a method for creating a content detection dataset in accordance with at least one embodiment of the invention.

FIG. 2 illustrates an exemplary flow diagram representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 2 is a flow diagram of a method 200 for generating a content detection dataset in accordance with at least one embodiment of the present principles. The method 200 begins at 202 and proceeds to 204 where the database of files is accessed (i.e., recalled from memory).

At 206, for each file in the database, the method 200 accesses the file contents and the file metadata that is associated with the each of the files. The metadata may include the file creation date as well as other indicia of an estimated date or time period in which the file was created such as references to specific dates in the file, references to operating systems that were available after particular dates, header information, compiler information, and the like. In some instances, the file author may alter the creation date such that the creation date stated in the file metadata cannot be relied upon as the sole creation date indicator. The file content may also provide information regarding file creation date. For example, the contents may include dates and times that may infer when the file was created. As such, the method 200 compiles the other metadata factors and content information to confirm the creation date. If a creation date is not available or is believed to be incorrect, the method uses the additional metadata and content information to derive an estimate of the creation date. The metadata may be found within the file or be supplied from a source outside of the file.

At 208, the method 200 derives file creation dates (actual or estimated) using the metadata and file content. The metadata and content analysis may be performed by a searching and sorting algorithm or a machine learning neural network (model) that is trained to classify the metadata/content and derive a creation date. Such a machine learning model is trained with creation date indicia that typically appears in file metadata and/or file content. From these indicia, the model derives a creation date. The creation date may be a specific date, a range of dates, a time period, a reasonable creation date estimate and the like. Using the creation date or an estimate of the creation date is much more important as a measure of relevancy than the use of a first detection date as a measure of relevancy. Thus, using a dataset containing relevant files based on creation date for training a model produces a more accurate model than would be produced using a training dataset defined by first detection dates.

At 210, the method 200 selects files with the highest relevancy (i.e., recent creation date) as content samples to be used in the dataset. For example, a file with a relatively recent creation date may be more relevant than an older date. At 212, the selected samples and their associated creation dates are stored in a content detection dataset. In some embodiments, rather than store the creation date, a relevancy score is defined, in part, using the creation date and this relevancy score is stored in the dataset. Once the dataset is populated with relevant samples and dates/scores, the method 200 ends at 214.

The content detection dataset may be used for training machine learning models to detect the content samples identified in the dataset as well as unknown samples. The creation dates are useful to establish weights and biases within a neural network that is trained to identify content samples in files that the neural network has not used for training. The scores enable the neural network to understand the characteristics of content such that unknown content samples may be identified and classified.

Figure 3:
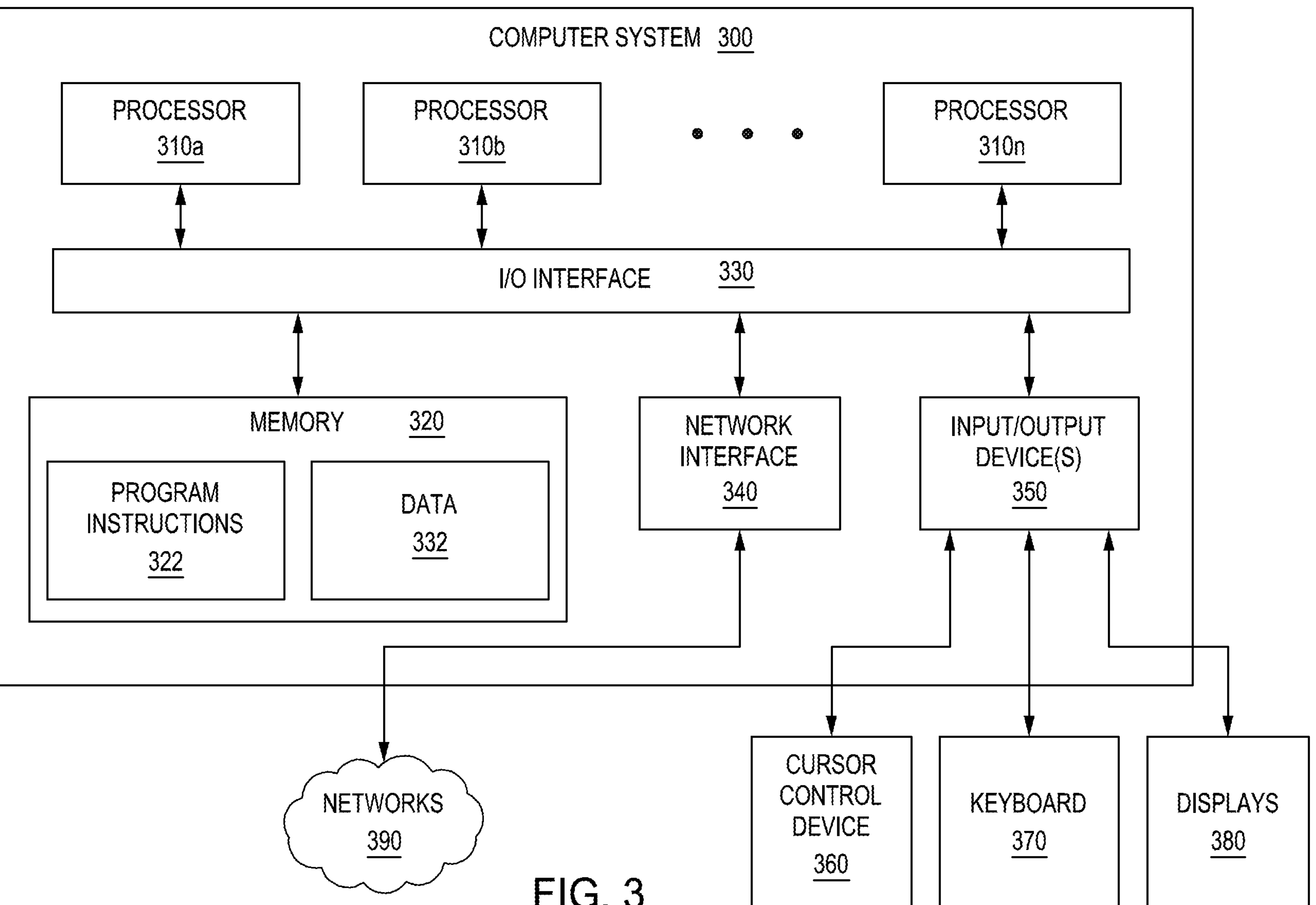
FIG. 3 depicts a high-level block diagram of a computing device suitable for use with embodiments of a system for generating a content detection dataset in accordance with at least one embodiment of the invention.

FIG. 3 depicts a computer system 300 that can be utilized in various embodiments of the present invention to implement the computer and/or the display, according to one or more embodiments.

Various embodiments of method and system for generating a dataset, as described herein, may be executed on one or more computer systems, which may interact with various other devices. One such computer system is computer system 300 illustrated by FIG. 3, which may in various embodiments implement any of the elements or functionality illustrated in FIGS. 1 and 2. In various embodiments, computer system 300 may be configured to implement methods described above. The computer system 300 may be used to implement any other system, device, element, functionality or method of the above-described embodiments. In the illustrated embodiments, computer system 300 may be configured to implement the user devices 102, dataset computer 108 and server 106 and implement the method 300 as processor-executable executable program instructions 322 (e.g., program instructions executable by processor(s) 310) in various embodiments.

In the illustrated embodiment, computer system 300 includes one or more processors 310*a*-310*n* coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of the components may be utilized by the system to receive user input described above. In various embodiments, a user interface may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs). In multiprocessor systems, each of the processors 310 may commonly, but not necessarily, implement the same ISA.

System memory 320 may be configured to store program instructions 322 and/or data 332 accessible by processor 310. In various embodiments, system memory 320 may be implemented using any non-transitory computer readable media including any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example, via digital fiber communications networks; via storage area networks such as Fiber Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the operations and methods described above, such as the methods illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description on a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

EXAMPLE CLAUSES

A. A method for generating a content detection dataset comprising:
accessing a database comprising data files;
accessing file content and metadata from the database;
analyzing, using a machine learning model, the file content and metadata to derive a creation date for each file;
selecting particular files as content samples based upon the creation dates; and storing the content samples and associated creation dates in the content detection dataset.

B. The method of clause A, wherein the metadata comprises at least one of a creation date or indicia of a creation date.

C. The method of clauses A or B, wherein the indicia comprise at least one of references to specific dates in the file, references to operating systems or application versions that were available after particular dates, header information, or compiler information.

D. The method of clauses A-C, wherein files having a recent creation date are more relevant than an older creation date.

E. The method of clauses A-D, wherein the malware files having the most recent creation dates are selected as content samples.

F. The method of clauses A-E, wherein analyzing the metadata and file content comprises processing the metadata using a machine learning model.

G. The method of clauses A-F, wherein the database comprises malware files and clean files.

H. The method of clauses A-G, wherein the content detection dataset is used to train a content detector.

I. Apparatus for generating a content detection dataset comprising at least one processor coupled to at least one non-transitory computer readable medium having instructions stored thereon, which, when executed by the at least one processor, cause the at least one processor to perform operations comprising:
accessing a database comprising data files;
accessing file content and metadata from the database;
analyzing, using a machine learning model, the file content and metadata to derive a creation date for each file;
selecting particular files as content samples based upon the creation dates; and storing the content samples and associated creation dates in the content detection dataset.

J. The apparatus of clause I, wherein the metadata comprises at least one of a creation date or indicia of a creation date.

K. The apparatus of clauses I or J, wherein the indicia comprise at least one of references to specific dates in the file, references to operating systems or application versions that were available after particular dates, header information, or compiler information.

L. The apparatus of clauses I-K, wherein malware files having a recent creation date are more relevant than an older creation date.

M. The apparatus of clauses I-L, wherein the malware files having the most recent creation dates are selected as content samples.

N. The apparatus of clauses I-M, wherein analyzing the metadata comprises processing the metadata using a machine learning model.

O. The apparatus of clauses I-N, wherein the database comprises malware files and clean files.

P. The apparatus of clauses I-O, wherein the content detection dataset is used to train a content detector.

What is claimed is:

1. A method for generating a content detection dataset comprising:
accessing a database comprising a plurality of data files including malware files and clean files;
accessing content of the data files and metadata associated with the data files;
analyzing, using a machine learning model, the content of the data files and the metadata to determine an estimate of a creation date for each data file, wherein the creation date is an indicia of file relevance;
selecting particular data files of the plurality of data files as content samples for a content detector based upon the creation dates and associated file relevance; and storing the selected content samples and associated creation dates in the content detection dataset which is configured to train a machine learning model of the content detector to identify malware.

2. The method of claim 1, wherein the metadata comprises at least one of a creation date or indicia of a creation date.

3. The method of claim 2, wherein the indicia comprise at least one of references to specific dates in the data files, references to operating systems or application versions that were available after particular dates, header information, or compiler information.

4. The method of claim 1, wherein files having a recent creation date are more relevant than an older creation date.

5. The method of claim 4, wherein the malware files having the most recent creation dates are selected as content samples.

6. The method of claim 1, wherein analyzing the metadata and file content comprises processing the metadata using a machine learning model.

7. Apparatus for generating a content detection dataset comprising at least one processor coupled to at least one non-transitory computer readable medium having instructions stored thereon, which, when executed by the at least one processor, cause the at least one processor to perform operations comprising:

accessing a database comprising a plurality of data files including malware files and clean files;

accessing content of the data files and metadata associated with the data files;

analyzing, using a machine learning model, the content of the data files and the metadata to determine an estimate of a creation date for each data file, wherein the creation date is an indicia of file relevance;

selecting particular data files of the plurality of data files as content samples for a content detector based upon the creation dates and associated file relevance; and storing the selected content samples and associated creation dates in the content detection dataset which is configured to train a machine learning model of the content detector to identify malware.

8. The apparatus of claim 7, wherein the metadata comprises at least one of a creation date or indicia of a creation date.

9. The apparatus of claim 8, wherein the indicia comprise at least one of references to specific dates in the data files, references to operating systems or application versions that were available after particular dates, header information, or compiler information.

10. The apparatus of claim 7, wherein the malware files having a recent creation date are more relevant than an older creation date.

11. The apparatus of claim 10, wherein the malware files having the most recent creation dates are selected as content samples.

12. The apparatus of claim 7, wherein analyzing the metadata comprises processing the metadata using a machine learning model.

* * * * *